UNITED STATES PATENT OFFICE.

FERDINAND G. WIECHMANN, OF NEW YORK, N. Y., ASSIGNOR TO FENOFORM CORPORATION, OF HASTINGS-UPON-HUDSON, NEW YORK, A CORPORATION OF NEW YORK.

PRODUCTION OF ANHYDROUS REACTION PRODUCTS OF PHENOL AND FORMALDEHYDE.

1,126,926.  Specification of Letters Patent.  Patented Feb. 2, 1915.

No Drawing.  Application filed November 28, 1913. Serial No. 803,571.

*To all whom it may concern:*

Be it known that I, FERDINAND W. WIECHMANN, a citizen of the United States, residing at New York, in the county of New York and State of New York, have invented certain new and useful Improvements in Production of Anhydrous Reaction Products of Phenol and Formaldehyde, of which the following is a specification.

This invention relates to the production of anhydrous reaction products of phenol and formaldehyde; and it comprises a process of producing a liquid anhydrous reaction product by heating a mixture of phenol and paraform (paraformaldehyde) or of phenol and aqueous formaldehyde (formalin), with or without the addition of an agent promoting the combination between the phenol and formaldehyde, at a temperature below that at which any considerable rise of temperature due to self heating, or any separation of the reaction mixture into two layers, takes place, and in an open vessel or under other conditions permitting free escape of water vapor, etc., until an anhydrous liquid product has been produced, the water present or formed being thus removed without any appreciable loss of formaldehyde which, in the presence of the phenol, combines with the phenol and permits escape of water without escape of formaldehyde; more specifically it comprises such a process carried out at about 60° C. to avoid objectionable self-heating, the water present or formed being removed at this temperature without appreciable loss of formaldehyde and the process being continued until the desired anhydrous reaction product has been produced; it also comprises a process of dehydrating an aqueous solution of formaldehyde (formalin) or a mixture of phenol and aqueous formaldehyde by adding phenol to the aqueous formaldehyde and heating the resulting mixture at a temperature below that at which separation into two layers takes place, e. g., 60° C., until the water has been removed and an anhydrous liquid product obtained; it also comprises a process of converting a thin liquid anhydrous reaction product of phenol and formaldehyde into a thick viscous anhydrous syrup, substantially insoluble in water, by heating such thin liquid in the presence of an agent promoting the reaction, at a temperature and under conditions such as already indicated until the desired insoluble viscous syrup has been produced; it further comprises a process of producing such a thick insoluble liquid reaction product from such a thin anhydrous liquid by using only a part of the necessary formaldehyde in forming the thin liquid and adding more paraform to this thin liquid, or by adding paraform in installments during the thickening of this liquid or near the end of the thickening; more specifically, it comprises such a process as has been already described according to which the aqueous formaldehyde or paraformaldehyde and phenol are used in approximately molecular proportions or with the formaldehyde in slight excess of molecular proportions, to produce the desired anhydrous liquid product; it further comprises a process of converting such a liquid anhydrous syrup as has already been described into a hard compact product either alone or in combination with a suitable compounding material such as vegetable ivory, asbestos, etc., by adding such material to the liquid product and subsequently heating the mixture to convert the same into a hard compact and infusible product; and it also comprises certain other novel features of the process and product resulting therefrom all as more fully hereinafter set forth and as claimed.

According to the process described in my application Serial No. 527,585 filed Nov. 12, 1909, I have proposed to treat a vegetable albumin such as vegetable ivory either with a liquid or pasty partial condensation product of phenol and formaldehyde or with a pulverized solid partial condensation product, and subsequently transform the resulting mixture into a hard infusible condition by heating. The partial condensation product used in such process was one resulting from the interaction of phenol and formaldehyde under conditions such that these reagents separated into two layers during their condensation, an aqueous layer and a layer of the liquid partial condensation product. This liquid product still contains water, as is readily indicated by test with anhydrous copper sulfate, is hygroscopic, and even when heated and converted into a pasty, or solid but soluble, form for compounding and molding is difficult to free from the last traces of water which is either stubbornly retained by the material or continually set free as the condensation proceeds. In heating and hardening with a composition it is usually necessary to use external pressure or a water-combining agent to prevent vaporization of this retained water and to avoid porosity in the molded and hardened product. Moreover it is difficult to obtain from such compositions, molded articles uniformly free from checks or cracks or other defects, due probably, either to the further condensation and elimination of water, or to the internal stresses set up in the product, during the hardening reaction.

In seeking to overcome these disadvantages accompanying the use of such partial condensation products, I have found that phenol and paraform, both of which are free from water, except perhaps water of hygroscopicity, can be made to react under the influence of heat and a suitable catalytic agent, to give a liquid reaction product which is substantially non-hygroscopic, anhydrous when tested with copper sulfate, substantially insoluble in water, and a thick viscous syrupy liquid at ordinary temperatures. In my application Serial Number 674,243, filed January 30, 1912, I have described the production of such a liquid anhydrous syrup resulting from the combination of phenol and paraform in the presence of dry ammonia, such product being a thick viscous non-hygroscopic syrup insoluble in water and anhydrous as indicated by test with copper sulfate. The present invention relates to improvements in the production of an anhydrous syrup of similar nature from phenol and paraform. This process which forms the subject matter of the present invention will now be described more in detail.

The reagents used in the process of the present invention are phenol and formaldehyde. A suitable form of phenol is crystallized phenol or carbolic acid. The formaldehyde may be in the form of paraform, the solid polymerized para-formaldehyde, or in the form of the aqueous solutions known as formalin containing about 40% of formaldehyde. The proportions of phenol and formaldehyde can be varied within rather wide limits. In general molecular proportions or a slight excess of formaldehyde over molecular proportions e. g. 33 parts of formaldehyde to 100 parts of phenol by weight, can be used with advantageous results. It is sometimes advantageous to add all the formaldehyde to the phenol at the outset, particularly when aqueous formaldehyde is used, but an additional amount of paraform can be added at a subsequent stage of the reaction and the desired anhydrous reaction product still obtained. The mixture of phenol and paraform or of phenol and formalin is heated at a temperature below that of objectionable self-heating, and below that at which the separation of an aqueous layer, takes place. With paraform and phenol a somewhat higher temperature can be safely used than with formalin and phenol. A temperature of 60° has been found advantageous for both processes, but this temperature can be varied and a somewhat higher or lower temperature also used, the time increasing with decrease in temperature, and vice versa, and the time also varying with the presence or absence of agents promoting the reaction, and the nature and amount of such agents when present. The heating is carried out under conditions permitting free escape of water vapors and other vapors evolved. Usually an open vessel is used. The heating is carried out advantageously with the addition of an agent promoting the combination of the phenol and the formaldehyde. As such agents may be mentioned both acids and alkalies, either singly or combined with each other or with phenol or formaldehyde, particularly ammonia or ammonium compounds such as ammonium carbonate, sodium hydrate, hexamethylenetetramine, etc. When paraform is used these agents are advantageously used in the dry state as by using them dry, their proportions may be more accurately controlled. The amount of such facilitating agents can be varied, but usually about $\frac{1}{2}$ to 1 % has been found to give excellent results, although smaller and larger amounts e. g. 0.1 or 1.5 %, have been used with marked success; the smaller quantities particularly at higher temperatures.

The processes using formalin and paraform differ somewhat in their details, particularly in that with formalin a large amount of water must be removed, but the generic character of the process I consider to be the same in both cases, and the method of procedure is substantially the same except for the removal of the large amount of water present when formalin is used. Looked at from one viewpoint, I consider the process of producing the anhydrous viscous syrup, which is substantially insoluble in water, a two-step process, the first step of which is the combining of the phenol and formaldehyde to form a thin liquid anhydrous solution or reaction product, and the second step the converting of this thin liquid into a thick anhydrous liquid insoluble in water. Whether paraform or formalin is used, the thin anhydrous liquid is first obtained. With paraform the procedure is much simplified by the absence of any appreciable amounts of water. With formalin, however, it is necessary to remove a large amount of water, this amount representing e. g. using equal volumes of 40% formalin and phenol, about 30% of the total mixture. The same, or practically the same, temperature, however, is used both with paraform and formalin, it being usually necessary to use greater care in controlling the temperature with the latter than the former. The nature and amounts of catalytic or other agents used to promote the reaction are practically the same with both processes, and the same or equivalent anhydrous liquid reaction products are obtained in both cases. The time necessary when formalin is used is somewhat greater, because of the necessity of first removing the water present in considerable amount, but after the removal of this water and the formation of the thin anhydrous liquid, the thickening and the subsequent procedure is substantially the same in both cases. The catalytic or other agent, such as already referred to, can be added at the outset, or after the anhydrous liquid has been produced. The time required for the production of the thick viscous anhydrous syrup varies with the particular agent used to promote the reaction, as well as with the amount of this reagent and the temperature employed.

The following more detailed description illustrates by way of examples how the process of the present invention can be performed. About 33 parts of paraform added either in one lot or by successive installments to 75 parts of phenol, are heated at about 60° C. with the addition of about ½ to 1% of ammonium carbonate and the mixture is maintained at about this temperature until an anhydrous liquid product has been produced, and the heating is continued at this same temperature until the odor of formaldehyde has practically disappeared and a thick viscous syrup has been formed. This usually requires about two or three days. At this temperature, no objectionable rise of temperature due to self heating takes place. The heating is carried out in an open vessel and the loss of the paraform by volatilization is small. Instead of ammonium carbonate other reagents can be used in a similar manner and in a similar or corresponding amount, for example, sodium or calcium phenolate, sodium hydrate, etc., e. g. in an amount corresponding to about ½ to 1% of CaO or its equivalent. When smaller amounts of the reagents are used, a longer time is required for carrying out the process. The reaction can also be hastened by increasing the temperature, but at low temperatures such as that indicated, the reaction can be allowed to proceed to completion without requiring any attention other than occasional examination to determine whether the reaction is complete. The mixture can be heated by any suitable means such as exhaust steam or hot water, gas etc. At the beginning of the reaction, the paraform dissolves in the phenol and appears to form solution combinations since the product is usually readily soluble in water. By permitting free escape of water vapor an anhydrous liquid can be produced directly, all water being thus permitted free escape while the product is thinly fluid. During the subsequent heating the thin liquid is converted into the thick anhydrous syrup already referred to. As the reaction proceeds, the thin liquid first formed gradually thickens until, at the end of the process, the liquid is in the form of a thick viscous syrup flowing with difficulty at ordinary temperatures but more fluid when heated. When all of the paraform is added at the outset, the desired reaction is complete when the odor of formaldehyde has substantially disappeared indicating that all of the paraform has been combined. It is frequently more advantageous to add the paraform by installments since in this way the amount of free phenol in the resulting syrup can be minimized. It is sometimes advantageous to add the last of the paraform near the end of the process for this purpose. The process of the present invention is further carried out at such a temperature that little if any formaldehyde is lost in vaporization. The intimacy of the solution of the paraform in the phenol and of the combination of the paraform with the phenol formed at the outset of the reaction, are such that at the temperature indicated there is but little tendency for the paraform to be vaporized and lost as formaldehyde vapor.

When phenol and aqueous formaldehyde are used I consider the first step of the process the evaporation of the water from the mixture and the dehydration of the formaldehyde. When a mixture of phenol and formalin are boiled or heated to high temperatures a considerable amount of formaldehyde is volatilized and lost. To avoid this loss it has been proposed to use closed vessels or a reflux condenser and thus prevent escape of any vapors formed. When higher temperatures are used there is also a separation of the reaction mixture into two layers, one of the reaction product formed and the other an aqueous layer. The disadvantages attending such reactions have already been pointed out. I have discovered, however, that these disadvantages can be overcome, and that anhydrous liquid products can be obtained directly from phenol and formalin by first removing the water from the mixture before an insoluble reaction product has been produced. I have discovered that by keeping the temperature below that of objectionable self-heating and below that at which a separation into two layers, as already described, takes place, the water can be evaporated without appreciable evaporation and loss of formaldehyde, and that it is thus possible to obtain anhydrous liquid products even from 40% aqueous formaldehyde. While I do not desire to limit myself by any theoretical explanation of the reaction which takes place yet I believe a loose or preliminary combination of the phenol and formaldehyde to take place at the same time that the water is being removed so that the formaldehyde is held in solution in the phenol or in combination therewith and kept from being evaporated while the water is being removed, the preliminary solution or reaction products being subsequently converted by subsequent heating into the viscous anhydrous syrup already described, in substantially the same manner as the solution products of paraform and phenol are converted into the viscous syrup.

When using formalin a small amount of an agent promoting the combination of the phenol and formaldehyde e. g. ammonia, a phenolate etc. can be added either at the outset or after the removal of the water. It is sometimes advantageous to use a reduced pressure to facilitate removal of water, but I have found that the dehydration can readily be effected at atmospheric pressure by heating in an open vessel under conditions permitting ready escape of water vapor, and particularly in an open vessel presenting a large surface of liquid from which the escape of water vapor can take place. Except for this preliminary dehydration of the formalin I consider the process using paraform and that using formalin the equivalent of each other and resulting in the same or equivalent products. I consider, however, the dehydration of the formalin in the presence of phenol at temperatures such as described as a novel feature of the invention when formalin is used, and I believe I am the first to discover a process of producing an anhydrous liquid solution or reaction product from phenol and aqueous formaldehyde. This product, as already indicated, I consider in its final form to be the same as, or equivalent to, that produced from paraform and phenol as described in my prior application Ser. No. 674,243. And I consider the evaporation of formalin in the presence of phenol to form an anhydrous liquid the equivalent, so far as the nature of the resulting product is concerned, of mixing paraform directly with phenol and heating the mixture to form a thin liquid anhydrous product having the same or substantially the same properties.

As already indicated, it is sometimes advantageous to add part of the formaldehyde to the anhydrous liquid during its subsequent heating and thickening. For this purpose I use dry paraform which I add either by installments or near the end of the process, it being possible to decrease and minimize free or loosely combined phenol in this way in the final syrup, and by using paraform the anhydrous syrup is still obtained. The amount of this added paraform will depend upon the results desired and the amount of formaldehyde originally employed.

It is not essential that the process should be stopped as soon as the reaction has been completed and the desired anhydrous liquid syrup obtained. The only effect of further heating at the same temperature is to gradually thicken the syrup and the thickened syrup can be used and compounded and subsequently hardened as well as the syrup itself. When it is desired to compound this syrup, the process should be stopped before the thickened syrup has been converted into a solid condition, which is obtained by further heating, since the compounding of the liquid product offers many advantages over the compounding of the solid product.

As the heating of the liquid anhydrous syrup is continued, and particularly at a somewhat higher temperature, this liquid is thickened and converted into a solid, which in its early stages is plastic and moldable, but which in its final form is hard and infusible and difficultly soluble in most ordinary solvents. The liquid syrup can be similarly converted into the hard infusible form when mixed with various compounding materials such as ground ivory nut or similar vegetable albumin, as more fully described in my application Serial Number 803,570 filed Nov. 28, 1913. The conversion of this liquid syrup into the solid form can be effected merely by heating, but in the formation of harder products, the syrup either alone or compounded with various compounding materials can be molded hot under pressure or molded first under pressure and subsequently heated to effect the hardening in accordance with the usual processes known in the art for molding plastic materials. Since the compounding can be effected with a liquid instead of a solid, the molding can be carried out at low temperatures as well as by heating to higher temperatures and the molded article subsequently further heated to effect the hardening.

I have found that the hardening of the anhydrous syrup, either alone or when compounded with various compounding materials, can be accelerated and the final product obtained in a much shorter time by adding to the liquid product, hardening agents such for instance as calcium oxid or phenolate, sodium hydroxid or phenolate, etc., in an amount of e. g. $\frac{1}{4}$ to 1%, and heating the materials in a suitably heated mold; and that from the hardened anhydrous syrup the final products can be obtained. The liquid syrup before hardening is substantially tasteless and odorless or with a very faint but characteristic odor. More or less uncombined, or loosely compounded phenol may be present but the amount of such phenol can be minimized as already described by the addition of part of the paraform near the end of the process. The use of such a hardening agent as already described appears to cause part or all of any loosely combined phenol present to become compounded in the final hardened product. More or less phenol may however be present in the final product in a state of solid solution or in a state of chemical or physical combination. The final hardening is probably due either to a polymerization of the constituents of the anhydrous syrup or to a change in the colloidal condition during the hardening; but I do not wish to limit myself by any theoretical explanation of the change of the liquid product into the solid infusible form.

Various compounding materials, fillers, abrasives etc. can be added to the liquid anhydrous product and thus incorporated in the final product. The nature of such modifying substances, fillers, etc., will depend upon the uses to which the product is to be put. Among the compounding materials of particular value is ground ivory nut or corozo. With ground ivory nut, for example, various proportions of the syrup and the powder can be used. For some purposes equal proportions of the ground ivory nut and of the anhydrous liquid product give good results. These proportions, however, can be varied within rather wide limits and other compounding material, etc. also added. Since the compounding thus takes place directly with a liquid, as distinguished from a solid which must be comminuted and subsequently heated to effect fusion, or with a solution made from a solid, the compounding can be readily effected at ordinary temperatures, although a slight heating renders the compounding somewhat easier, owing to the less viscous nature of the liquid when warm, and the process can thus be materially shortened and simplified and made correspondingly less expensive. The specific composition resulting from the use of ground ivory nuts and similar albuminous material is described more in detail in my application Serial No. 805,570, filed November 28, 1913.

Articles made of the pure syrup or of the compounded syrup, remain practically the same size and shape of the mold, contracting, however, sufficient to enable easy removal therefrom in case the hardening has been carried out in the mold. The final product is of great stability and is free from the tendency to crack or check or be distorted and it is superior to and distinguished from the condensation products used in the processes described in my application Serial No. 527,585 hereinbefore referred to.

The anhydrous liquid reaction produced according to the present invention is a valuable material for varnishes, lacquers, etc., when dissolved in the usual varnish solvents such as alcohol, amyl alcohol, etc. The thick viscous syrup is not only anhydrous when tested with anhydrous copper sulfate, but it is practically odorless and substantially non-hygroscopic, so that when used as a varnish or lacquer or impregnating solution the precautions necessary in the case of hygroscopic substances are minimized.

Instead of the phenol or crystalline carbolic acid described in the foregoing description I may use a less pure phenol or certain homologues of phenol which enable a similar or equivalent anhydrous liquid reaction product to be produced, and accordingly I consider these homologues, etc., as equivalents of phenol in the present invention.

In referring to the anhydrous reaction products produced according to the present invention I use the term anhydrous to mean free from water as indicated by test with anhydrous copper sulfate.

I claim:—

1. The process of producing anhydrous liquid reaction products of phenol and formaldehyde which comprises heating a mixture of phenol and formaldehyde to a temperature below that at which any considerable rise of temperature due to self heating takes place until an anhydrous liquid reaction product has been produced.

2. The process of producing anhydrous liquid reaction products of phenol and formaldehyde which comprises heating a mixture of phenol and formaldehyde to a temperature below that at which any considerable rise of temperature due to self heating takes place until an anhydrous liquid reaction product has been produced and continuing the heating of the resulting liquid in the presence of an agent promoting the reaction until it has been converted into a thick anhydrous syrup substantially insoluble in water.

3. The process of producing anhydrous liquid reaction products of phenol and formaldehyde which comprises heating a mixture of phenol and formaldehyde to a temperature below that at which any considerable rise of temperature due to self heating takes place until an anhydrous liquid reaction product has been produced and continuing the heating of the resulting liquid in the presence of an agent promoting the reaction at a temperature below that at which any material loss of formaldehyde vapor takes place until a thick viscous anhydrous syrup is obtained, substantially insoluble in water.

4. The process of producing anhydrous liquid reaction products of phenol and formaldehyde which comprises heating a mixture of phenol and formaldehyde in the presence of an agent promoting the reaction, to a temperature below that at which any considerable rise of temperature due to self heating takes place until an anhydrous liquid reaction product has been produced.

5. The process of producing anhydrous liquid reaction products of phenol and formaldehyde which comprises heating a mixture of phenol and formaldehyde in the presence of an agent promoting the reaction, to a temperature below that at which any considerable rise of temperature due to self heating takes place until an anhydrous liquid reaction product has been produced and continuing the heating of the resulting liquid until it has been converted into a thick anhydrous syrup substantially insoluble in water.

6. The process of producing anhydrous liquid reaction products of phenol and formaldehyde which comprises heating a mixture of phenol and aqueous formaldehyde at a temperature below that at which a separation of the reaction mixture into two layers takes place until the water has been removed and an anhydrous liquid reaction product produced.

7. The process of producing anhydrous liquid reaction products of phenol and formaldehyde which comprises heating a mixture of phenol and aqueous formaldehyde in the presence of an agent promoting the reaction at a temperature below that at which a separation of the reaction mixture into two layers takes place until the water has been removed and an anhydrous liquid reaction product produced.

8. The process of producing anhydrous liquid reaction products of phenol and formaldehyde which comprises heating a mixture of phenol and aqueous formaldehyde at a temperature below that at which a separation of the reaction mixture into two layers takes place until the water has been removed and an anhydrous liquid reaction product produced and continuing the heating of the resulting liquid in the presence of an agent promoting the reaction until it has been converted into a thick anhydrous syrup substantially insoluble in water.

9. The process of producing anhydrous liquid reaction products of phenol and formaldehyde which comprises heating a mixture of phenol and aqueous formaldehyde in the presence of an agent promoting the reaction at a temperature below that at which a separation of the reaction mixture into two layers takes place until the water has been removed and an anhydrous liquid reaction product produced and continuing the heating of the resulting liquid in the presence of an agent promoting the reaction until it has been converted into a thick anhydrous syrup substantially insoluble in water.

10. In the art of producing anhydrous liquid reaction products of phenol and formaldehyde insoluble in water the process which comprises heating a thin liquid reaction product of phenol and formaldehyde in an open vessel at a temperature below that at which any considerable rise of temperature due to self heating takes place until a thick anhydrous syrup has been produced substantially insoluble in water.

11. The process of removing water from a mixture of phenol and aqueous formaldehyde which comprises heating such mixture under conditions permitting free escape of water vapors and at a temperature at which practically no formaldehyde is vaporized until an anhydrous liquid has been produced.

12. The process of removing water from a mixture of phenol and aqueous formaldehyde which comprises heating such mixture at a pressure not greater than atmospheric and under conditions permitting free escape of water vapors and at a temperature at which practically no formaldehyde is vaporized until an anhydrous liquid has been produced.

13. The process of removing water from a mixture of phenol and aqueous formaldehyde which comprises heating such mixture in the presence of an agent promoting the combination of the phenol and formaldehyde under conditions permitting free escape of water vapors and at a temperature at which practically no formaldehyde is vaporized until an anhydrous liquid has been produced.

14. The process of removing water from a mixture of phenol and aqueous formaldehyde which comprises evaporating the water from such mixture in an open vessel permitting free escape of water vapor and at a temperature at which practically no formaldehyde is vaporized until an anhydrous liquid has been produced.

15. The process of removing water from a mixture of phenol and aqueous formaldehyde which comprises evaporating the water from such mixture in an open vessel permitting free escape of water vapor, in the presence of an agent promoting the combination of the phenol and formaldehyde, and at a temperature at which practically no formaldehyde is vaporized, until an anhydrous liquid has been produced.

16. The process of producing anhydrous liquid reaction products of phenol and formaldehyde which comprises heating a mixture of phenol and formaldehyde to a temperature of about 60° C. until an anhydrous liquid reaction product has been produced.

17. The process of producing anhydrous liquid reaction products of phenol and formaldehyde which comprises heating a mixture of phenol and formaldehyde to a temperature of about 60° C. until an anhydrous liquid reaction product has been produced and continuing the heating of the resulting liquid in the presence of an agent promoting the reaction until it has been converted into a thick anhydrous syrup substantially insoluble in water.

18. The process of producing anhydrous liquid reaction products of phenol and formaldehyde which comprises heating a mixture of phenol and formaldehyde to a temperature of about 60° C. until an anhydrous liquid reaction product has been produced and continuing the heating of the resulting liquid in the presence of an agent promoting the reaction at a temperature below that at which any material loss of formaldehyde vapor takes place until a thick viscous anhydrous syrup is obtained, substantially insoluble in water.

19. The process of producing anhydrous liquid reaction products of phenol and formaldehyde which comprises heating a mixture of phenol and formaldehyde in the presence of an agent promoting the reaction, to a temperature of about 60° C. until an anhydrous liquid reaction product has been produced.

20. The process of producing anhydrous liquid reaction products of phenol and formaldehyde which comprises heating a mixture of phenol and formaldehyde in the presence of an agent promoting the reaction to a temperature of about 60° C until an anhydrous liquid reaction product has been produced and continuing the heating of the resulting liquid until it has been converted into a thick anhydrous syrup substantially insoluble in water.

21. The process of producing anhydrous liquid reaction products of phenol and formaldehyde which comprises heating a mixture of phenol and aqueous formaldehyde at a temperature of about 60° C. until the water has been removed and an anhydrous liquid reaction product produced.

22. The process of producing anhydrous liquid reaction products of phenol and formaldehyde which comprises heating a mixture of phenol and aqueous formaldehyde in the presence of an agent promoting the reaction at a temperature of about 60° C. until the water has been removed and an anhydrous liquid reaction product produced.

23. The process of producing anhydrous liquid reaction products of phenol and formaldehyde which comprises heating a mixture of phenol and aqueous formaldehyde at a temperature of about 60° C. until the water has been removed and an anhydrous liquid reaction product produced and continuing the heating of the resulting liquid in the presence of an agent promoting the reaction until it has been converted into a thick anhydrous syrup substantially insoluble in water.

24. The process of producing anhydrous liquid reaction products of phenol and formaldehyde which comprises heating a mixture of phenol and aqueous formaldehyde in the presence of an agent promoting the reaction at a temperature of about 60° C. until the water has been removed and an anhydrous liquid reaction product produced and continuing the heating of the resulting liquid in the presence of an agent promoting the reaction until it has been converted into a thick anhydrous syrup substantially insoluble in water.

25. In the art of producing anhydrous liquid reaction products of phenol and formaldehyde insoluble in water the process which comprises heating a thin liquid reaction product of phenol and formaldehyde in an open vessel at a temperature of about 60° C. until a thick anhydrous syrup has been produced substantially insoluble in water.

26. The process of removing water from a mixture of phenol and aqueous formaldehyde which comprises heating such mixture at a pressure not greater than atmospheric and under conditions permitting free escape of water vapors and at a temperature of about 60° C. until an anhydrous liquid has been produced.

27. The process of removing water from a mixture of phenol and aqueous formaldehyde which comprises evaporating the water from such mixture in an open vessel permitting free escape of water vapor and at a temperature of about 60° C. until an anhydrous liquid has been produced.

28. The process of removing water from a mixture of phenol and aqueous formaldehyde which comprises evaporating the water from such mixture in an open vessel permitting free escape of water vapor, in the presence of an agent promoting the combination of the phenol and formaldehyde, and at a temperature of about 60° C. until an anhydrous liquid has been produced.

FERDINAND G. WIECHMANN.

Witnesses:
PAUL POETSCHKE,
WARD W. SIMMONS.